United States Patent Office 3,349,040
Patented Oct. 24, 1967

3,349,040
PEROXIDE CURING OF UNSATURATED POLYESTER RESINS AND FORMULATIONS THEREFOR
Donald M. Kressin, Getzville, Solomon C. Westbrook, Jr., Buffalo, Orville L. Mageli, Kenmore, and James R. Kolczynski, Williamsville, N.Y., assignors to Wallace & Tiernan, Inc., East Orange, N.J., a corporation of Delaware
No Drawing. Filed Apr. 17, 1967, Ser. No. 631,174
13 Claims. (Cl. 252—182)

ABSTRACT OF THE DISCLOSURE 3,5 - dimethyl - 3,5 - dihydroxy - 1,2 - peroxycyclopentane in solution in certain organic liquids having substantial solubility in water—water may be present. Example: Equal parts by weight of the peroxycyclopentane, hexylene glycol and water. The solutions are exceptional curing catalysts for unsaturated polyester resins.

Cross-reference to related application

This is a continuation-in-part of our copending application Ser. No. 415,799 filed Dec. 3, 1964, now abandoned.

This invention relates to peroxide curing of unsaturated polyester resins and to novel peroxide formulations suitable for such use.

Methyl ethyl ketone peroxide solutions have been available in the United States since 1949, and have become standard catalysts for curing of unsaturated polyester resins. To give room temperature cures they are used in combination with a cobalt or cobalt-amine activator system.

Because of the nature of the reaction between hydrogen peroxide and methyl ethyl ketone, all commercial solutions contain from 3 to 5 or more peroxidic components. These peroxides vary in catalytic activity and hazard. They are all too hazardous to be used in the pure state and therefore the products are marketed in solution, usually in dimethyl phthalate. Although peroxide manufacturers have improved the safety characteristics of some methyl ethyl ketone peroxide formulations, several products are of such a nature that careful handling is essential.

Several of the peroxidic components of a methyl ethyl ketone peroxide solution are labile, that is, they can rearrange to form other structures without loss of active oxygen. This lends to changes in activity of the mixture, since the compounds vary in reactivity toward the activator systems. So called "activity drift" occurs which makes it difficult for the manufacturer to control production.

It has been discovered that unsaturated polyester resins may be conveniently cured at moderate temperatures by admixing 3,5 - dimethyl - 3,5 - dihydroxy - 1,2 - peroxycyclopentane therewith in a curing amount and maintaining the admixture at the curing temperature for curing time; it is desirable to have present in the admixture an ethylenically unsaturated co-reactant such as a styrene or allyl phthalate.

The peroxide formulations consist essentially of 3,5-dimethyl - 3,5 - dihydroxy - 1,2 - peroxycyclopentane and organic liquid which has a substantial solubility in water. Particularly suitable organic liquids are alkanols, glycols, ethers, ketones, esters, heterocyclic amides, and/or heterocyclic alcohols; water containing solutions of these organic liquids are also especially suitable. Desirably the active oxygen content of these formulations is between about 1 and 6 percent.

A particularly advantageous aspect of the invention lies in an admixture consisting essentially of an unsaturated polyester resin admixed with a curing amount of peroxycyclopentane; this admixture may include an ethylenically unsaturated co-reactant such as a styrene or allyl phthalate.

Suitable curing formulations may consist of solid 3,5-dimethyl - 3,5 - dihydroxy - 1,2 - peroxycyclopentane intimately dispersed in a liquid so as to produce a paste composition; phthalate esters are particularly suitable paste forming organic liquids.

The peroxide utilized in the curing method and formulations of the invention is prepared by the reaction of acetyl-acetone with hydrogen peroxide in an equi-molar ratio to form a cyclic peroxide named, 3,5 - dimethyl-3,5 - dihydroxy - 1,2 - peroxycyclopentane.

This compound is believed to have the configuration:

I.
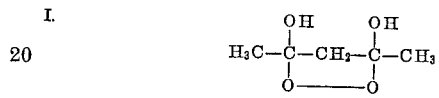

Procedures for the preparation of this peroxide which is hereinafter referred to as peroxide I are set forth in a paper of Milas et al. JACS 85 222 (1963) and U.S. Patent No. 3,149,126, Sept. 15, 1964. Peroxide I herein named is shown in configuration in these publications as peroxide IV.

It has been discovered that peroxide I is extremely effective as a curing agent for the unsaturated polyester resins commonly cured with methyl ethyl ketone peroxide known today (hereinafter methyl ethyl ketone peroxides will be referred to as MEK peroxides). The hereinafter set forth data will establish that amounts of peroxide I corresponding to a formulation having 4% active oxygen content are more effective as curing agents than equal amounts of MEK peroxides in formulations having 11% active oxygen content.

Peroxide I is effective in curing not only the unsaturated polyester resin itself but also admixtures of these resins with co-reactants, especially the ethylenically unsaturated co-reactants such as members of the styrene hydrocarbons and allyl phthalate group of esters.

The effectiveness of peroxide I is favorably influenced, like the MEK peroxides, by the presence of a metal activator in the curing mixture. Any of the commonly used and known metal activators used for this process may be used with peroxide I. In general, the preferred metal activators are compounds of cobalt, nickel, iron, manganese, titanium and vanadium. It is preferred to utilize oil soluble compounds, especially the cobalt compounds like cobalt napthenate.

It is common to doubly promote MEK peroxides by the presence of an amine along with the metal activator. Such double promotion may be used with peroxide I. However, peroxide I is so effective that double promotion is necessary only in rare situations where extreme rate of cure is necessary.

The effectiveness of peroxide I at moderate temperatures and its response to promotion by metal activators permit a unique control of catalytic activity. It is possible to closely control curing times for a particular resin at a particular temperature by varying either the amount of peroxide I added, or the amount of metal activator added.

By utilizing both peroxide I and a metal activator it is possible to cure unsaturated polyester resins alone or in combination with a co-reactant such as styrene or diallyl phthalate at, in effect room temperatures, of about 60°–100° F. (about 15.5–37.8° C.). It is self-evident that the curing time will be dependent upon the type of unsaturated polyester resin, the type of co-reactant, if any, and the amount thereof, the amount of peroxide I added, the type and amount of metal activator, if any, added, as well as the curing temperature.

Peroxide I is a white crystalline solid. The curing can be carried out by admixing the solid peroxide I into the resin to be cured. However, it is preferred to utilize either a liquid formulation or a paste formulation to introduce the peroxide I into the resin to be cured.

The liquid formulations may have the viscosity inherent to the combination of constituents or the viscosity may be increased by the addition of thickening agents.

It has been discovered that peroxide I may be converted to a liquid formulation by solution in organic liquids which have substantial solubility in water (peroxide I is very soluble in water itself). In the preparation of peroxide I the water produced may be removed completely but it is preferred to maintain some or all of the water in the formulation. In general, the liquid formulations of the invention consist essentially of peroxide I, organic liquid having substantial solubility in water, and water. Although the active oxygen content of the formulation can vary widely, in general the formulations are made up to have an active oxygen content of between about 1 and 6 percent, e.g., 4%.

In general, the preferred organic liquid solvents which have substantial solubility in water fall in the class of alkanols, glycols including ether glycols, ethers, ketones, esters, heterocyclic amides, and heterocyclic alcohols. Mixtures of these solvents may be used. Also, water containing solutions of these solvents may be used.

It has been observed that the presence of heterocyclic amides as a constituent in these liquid formulations has advantages. It is preferred to utilize the N-alkyl 2-pyrrolidone where the alkyl has 1–4 carbon atoms. An especially preferred heterocyclic amide is N-methyl-2-pyrrolidone, hereinafter referred to as NM2P.

The phosphate esters are particularly suitable because they impart burning resistance to the formulation. Triethyl phosphate is a preferred member of this group.

Other particularly desirable species of solvents are propylene glycols and tetrahydrofurfuryl alcohol.

In general, the more desirable liquid formulations include about 10–50% of peroxide I; water from "none" to about 35%; and defined organic liquid about 15–90%. When speaking of formulations all percentages are by weight and based on the total formulation. In the more preferred formulations the water content is not more than about 15%. More commonly the peroxide I content falls in the range of about 20–40%.

As has been mentioned earlier, the presence of heterocyclic amide in the formulation is advantageous, and it is preferred that the formulation include at least about 3% of N-alkyl-2-pyrrolidone where the alkyl group has 1–4 carbon atoms, and more preferably NM2P.

For purposes of illustration a number of especially preferred formulations are given.

(1) Peroxide I about 30%; water about 12%; NM2P about 29%; and trietryl phosphate about 29%.
(2) Peroxide I about 30%; water about 12%; NM2P about 3%; and triethyl phosphate about 55%.
(3) Peroxide I about 30%; water about 5%; NM2P about 32% and triethyl phosphate about 33%.
(4) Peroxide I about 30%; water about 30%; NM2P about 3% and propylene glycol about 37%.
(5) Peroxide I about 30%; water about 12%; NM2P about 3% and tetrahydrofurfuryl alcohol about 55%.

All of these five formulations have an active oxygen content of close to 4%.

It has been discovered that the mixture of peroxide I and unsaturated polyester resins alone or in combination with ethylenically unsaturated co-reactant has an exceptionally long pot life—in the absence of metal activator—as compared to a mixture of unsaturated polyester resin and MEK peroxide. Thus, the invention contemplates a curable resin admixture consisting essentially of peroxide I in a curing amount, and an unsaturated polyester resin preferably including an ethylenically unsaturated co-reactant such as a styrene or allyl phthalate.

More preferably the curing resin admixture consists essentially of unsaturated polyester resin and a curing amount of a peroxide formulation consisting essentially of about 35% of peroxide I, not more than about 35% of water, and about 15–90% of the hereinbefore defined organic liquid solvent. Commonly, this admixture will include an ethylenically unsaturated co-reactant.

It is to be understood that when rapid moderate temperature cures are desired a metal activator as hereinbefore defined will have to be added to the above defined curable admixture.

The peroxide I curing agent and the hereinbefore defined formulations may be used with unsaturated polyester resins systems which include an inhibitor. Known inhibitors which include all the conventional commercial materials now in use have been tried with peroxide I and successful cures have been obtained.

Inhibitors which have been tried are:

p-Benzoquinone, t-butyl catechol, 2,5-di-phenyl-p-benzoquinone, 2,5-d-t-tmyl hydroquinone, 2,5-di-t-butyl hydroquinone, toluhydroquinone, 2,5-di-t-butyl quinone, HPT (Eastman Chemical Products), p-octylphenyl salicylate, resorcinol mono benzoate, tecquinol, 2,4,5-trihydroxy butyrophenone, 2,5-diphenol quinone, monotetrtiary butyl hydroquinone, hydroquinone and toluquinone.

It has been observed that the amount of inhibtor present does have influence on the curing time with peroxide I as the catalyst. However, it has been observed that rapid curves can be obtained even with present systems heavily loaded with inhibitors by increasing the amount of peroxide I added.

The curing effectiveness of peroxide I is demonstrated and compared to the effectiveness of a commercially available MEK peroxide formulation and the commercially interesting characteristics of a large range of formulations of peroxide I are set forth in the following tests. It is to be understood that these tests are not introduced to demonstate all formulations or possible resin systems and, therefore, do not limit the scope of the invention herein described.

*Illustrations and comparisons.—Tests A*

The flash point, ignition and burning characteristics, and ability of the formulation to be diluted with diallyl phthalate (DAP) was studied on a general formulation having a 4% active oxygen content:

| | Percent |
|---|---|
| Peroxide I | 30 |
| Water | 12 |
| N-methyl-2-pyrrolidone | 3 |
| Other solvent | 55 |

The ignition and burning times were determined on a 2 gram sample in direct contact with a Bunsen burner flame. The ability to accept DAP was determined by adding the phthalate to the formulation until a second phase appeared.

Methanol, ethanol and isopropanol gave the only formulations with a flash point below 200° F. With peroxide I formulations the flash point is determined by the solvent rather than by the peroxide as in MEW peroxide formulations.

Butylene glycol, ethylene glycol, propylene glycol, N-methyl-2-pyrrolidone, pent-oxol, tetrahydrofurfuryl alcohol, Carbitol, Cellosolve, butyl Cellosolve and Cellosolve acetate formulations were slow burning after long exposure to the flame.

Diacetone alcohol gave a formulation having a 35 second "short" ignition time.

The triethyl phosphate formulation did not burn.

The butylene glycol, ethylene glycol, propylene glycol, butyl Cellosolve and Carbitol formulations accepted less than 1 volume of DAP per volume of formulation.

The N-methyl-2-pyrrolidone formulation was completely miscible with DAP.

The tetrahydrofurfuryl alcohol, triethyl phosphate and ethanol formulations accepted about 4 volumes of DAP per volume of formulation.

The other above named solvents formulations accepted DAP to an extent between 1:1 and 4:1—volumes of DAP per volume of formulation.

Catalytic test procedures

Catalytic activities were determined at 30° C. or room temperature (23–25° C.). Gel and cure times were measured with a Sunshine Gel-Time Meter, Model 22, exotherms recorded on a Minneapolis-Honeywell strip chart recorder, Model 14, with Type J thermocouple.

So that the test work could be compared, studies were conducted in a standard polyester resin system having the composition shown in Table 1. For practical evaluation, a number of commercial resins were used.

Table 1.—Basic polyester resin system

| | | Percent |
|---|---|---|
| Maleic anhydride | mole | 1.0 |
| Phthalic anhydride | do | 1.0 |
| Propylene glycol | do | 2.2 | 70
| Acid No. | | 45–50 |
| Hydroquinone | percent | 0.013 |
| Styrene monomer | | 30 |

The formulation of the invention—hereinafter called Form I—used in the catalytic tests consisted of:

| | Percent |
|---|---|
| Peroxide I | 30 |
| Water | 30 |
| N-methyl-2-pyrrolidone | 29 |
| Triethyl phosphate | 29 | and had a 4% active oxygen content.

A commercial comparison formulation "DDM" consisted of methyl ethyl ketone peroxides, water and dimethyl phthalate and had a 11% active oxygen content.

Hereinafter the expressed catalyst amounts mean weight of formulation containing the particular peroxide, i.e. 1% of Form I actually represents 0.3% of peroxide I.

Test B—Drift

A characteristic of methyl ethyl ketone peroxide solution is a drift in activity. This "activity drift" is evidenced by marked changes in resin gel times. Table 2 shows 30° gel times measured over a period of eight weeks for 1% Form I plus 0.2% cobalt naphthenate (6%) in the basic polyester resin system. No significant change was detected.

TABLE 2.—CATALYTIC ACTIVITY DRIFT—30° C. GEL TIME

| Storage, Time/Temp. | Time in Minutes | | |
|---|---|---|---|
| | 4° C. | 23–25° C. | 40° C. |
| 0 | 11.7 | 11.7 | 11.7 |
| 1 week | 13.0 | 10.7 | 11.4 |
| 3 weeks | 12.4 | 10.6 | 11.6 |
| 6 weeks | 13.6 | 11.6 | 13.6 |
| 8 weeks | 12.1 | 12.3 | |

Test C.—Variation of catalytic activity with catalyst concentration

Table 3 illustrates the wide range of activity that can be obtained simply by varying concentrations. Cures are obtained at 0.5% which are equally as good but somewhat slower than those concentrations at 1.0%. (To obtain even slower cures, the promoter level should be decreased, rather than catalyst level.) Data in Table 4 show that the effect of a twenty-fold change in cobalt naphthenate concentration produces about a ten-fold change in gel and a cure time, at 1% catalyst addition.

TABLE 3.—VARIATION OF CATALYTIC ACTIVITY WITH CATALYST CONCENTRATION

| Catalyst | Form I | | | DDM |
|---|---|---|---|---|
| Catalyst added, percent | 1.0 | 0.75 | 0.5 | 1.0 |
| 30° C. Gel, (min.) | 9.8 | 15.4 | 23.3 | 30.3 |
| 25° C. Gel (min.) | 18.0 | 28.7 | 41.7 | 47.8 |
| 25° C. Cure (min.) | 22.1 | 34.0 | 50.7 | 82.1 |
| Peak Exotherm (° F.) | 320 | 318 | 294 | 183 |
| Barcol I | 40–50 | 40–50 | 35–45 | 30–40 |

TABLE 4.—VARIATION OF ACTIVITY WITH COBALT NAPHTHENATE ADDED

| Catalyst | Form I | | | DDM |
|---|---|---|---|---|
| Percent Cobalt Naphthenate (6%) | 0.4 | 0.2 | 0.10 | 0.02 |
| 30° C. Gel (min.) | 4.0 | 9.3 | 12.4 | 40.8 |
| 25° C. Gel (min.) | 8.3 | 17.5 | 26.0 | 84.6 |
| 25° C. Cure (min.) | 12.1 | 22.0 | 30.5 | 100.5 |
| Peak Exotherm, ° F | 320 | 320 | 308 | 205 |
| Barcol I | 45–50 | 40–50 | 40–50 | 25–30 |

The use of peroxide I in singly promoted resins thus offers the advantage of a wide range of activity previously possible only with the use of doubly accelerated resins, without the disadvantage of short resin shelf-life, as established below.

Test D.—Variation of gel time with temperature

The catalytic activities of MEK peroxides are temperature dependent. Table 5 shows how gel time varies in the basic resin catalyzed by 1% Form I and 1% DDM, over the practical working temperature range; 16° C. to 30° C. (60.8° F. to 86.0° F.)

TABLE 5

| Temperature (° F.) | Time in Minutes | |
|---|---|---|
| | 1% Form I | 1.0% DDM |
| 60.8 | 36.2 | |
| 68.0 | 23.6 | |
| 73.4 | | 62.5 |
| 75.2 | | 57.5 |
| 77.0 | 15.0 | |
| 86.0 | 9.8 | 35.2 |
| 100.0 | | 18.6 |

Test E.—Pot life

In two component systems, in which one portion of the resin contains all the promoter and the other, all the peroxide catalyst, it is necessary that the catalyzed portion of resin remain ungelled for at least several days. In Table 6 are shown the pot lives of six commercial unpromoted resins catalyzed with 1% Form I compared to those catalyzed with 1% DDM. The data show that several weeks shelf-life is possible with Form I, compared to a day or less with DDM.

TABLE 6

| Commercial Resin | Gel Time (Days) | |
|---|---|---|
| | Form I | DDM |
| 1 | 16 | 1 |
| 2 | 5 | 1– |
| 3 | 15 | 1 |
| 4 | 2 | 1+ |
| 5 | 45+ | 1 |
| 6 | 16 | 4 |

Test F

The effect of varying the amount of inhibitor added was studied using 1% of Form I and 0.5% cobalt naphthenate (6%). The results are shown in Table 7. (It is pointed out that the effect of inhibitor can be counteracted by using more peroxide I.)

TABLE 7.—EFFECT OF INCREASING INHIBITOR ADDITION, 25° C. CURE DATA

| Hydroquinone, Percent Inhibitor | Gel Time (min.) | Cure Time (min.) | Peak Exotherm, °F. | Barcol I |
|---|---|---|---|---|
| .013 | 7.0 | 9.8 | 315 | 45–50 |
| 0.02 | 23.3 | 27.2 | 310 | 45–50 |
| 0.05 | 46.0 | 50.0 | 282 | 30–40 |
| 0..10 | 120 | 136 | 215 | 15–20 |
| 0 | | | | |

Test G

In another study, polyester resin laminates were prepared from formulations of peroxide I at the 4.0 percent active oxygen level. Formulation II consisted of peroxide I, 30%; water, 12% and N-methyl-2-pyrrolidone, 58%. Formulation III consisted of peroxide I, 30%; water, 12%; and Cellosolve acetate, 58%. These were compared with DDM containing 11.0 percent active oxygen, at 1.0 percent catalyst addition. In the laminate tests, fiberglass cloth was impregnated with catalyzed polyester resin, then the rate of hardening and curing at 24° C. was observed. After initial gelling took place, Barcol hardness measurements were taken at 15 minute intervals for 60 minutes and again after standing overnight. Other samples were tested after storage for 1 hour at 100° C. The results of these tests are set out in Table 8.

TABLE 8

| | Form II | Form III | DDM |
|---|---|---|---|
| Gel time, mins | 28.3 | 23.3 | 38.3 |
| Time of first Barcol, mins | 38.1 | 36.7 | 106.0 |
| Barcol Hardness: | | | |
| 0 mins | 10–25 | 10–25 | 0–10 |
| 15 mins | 30–45 | 25–35 | 20–30 |
| 30 mins | 35–50 | 25–35 | 20–35 |
| 45 mins | 40–50 | 25–35 | 20–35 |
| 60 mins | 40–50 | 30–45 | 30–35 |
| 24 hrs | 40–50 | 40–45 | 30–40 |
| 1 hr. 100° C | 40–50 | 40–50 | 40–50 |

The gel time is the point at which the sample first solidifies. The first Barcol reading is taken at the point at which the laminate becomes firm. At this point the laminate usually is no longer sticky and can be handled carefully. At a reading of about Barcol 30, the laminate is hard enough to handle and can be transported or stacked in piles. This is significant to the fabricator in that it determines when his molds can be released for another operation.

It is seen in Table 8 that laminates catalyzed with peroxide I gelled in about 25 minutes and were firm enough for a Barcol reading after about 38 minutes. DDM had a slower gel time and required about 3 times as long for a Barcol reading.

The laminates prepared from peroxide I gelled and hardened much more rapidly than those prepared from DDM. Thus, in a total time of about 40 minutes after preparation began, the laminate from peroxide I could be handled. They could then be removed in about 50 minutes, with the entire operation requiring less than an hour. With the DDM there was time period of more than an hour and a half before the laminate could be handled. Over 2 hours had passed before the molds were freed. Further, standing overnight or exposure to elevated temperatures were required for the laminate to reach its final desired level of hardness. Thus, peroxide I saves about half the fabrication time and eliminates the need for elevated temperatures.

Additional description and tests

The classes of preferred organic liquid solvents which have substantial solubility in water are described in more detail as:

(1) Lower alkanols. These have 1–4 carbon atoms. Illustrative are methanol, ethanol, isopropanol, n-butyl alcohol and t-butyl alcohol.

(2) Benzyl alcohol.

(3) Lower glycols. These have 2–8 carbon atoms. Illustrative are ethylene glycol; propylene glycol; 1,4-butanediol; 2-butene-1,4-diol; hexanediol and octanediol.

(4) Ether glycols. All the ether glycols are very water soluble and are suitable for use as solvents in this invention. Illustrative are diethylene glycol, dipropylene glycol, tetraethylene glycol, and the polyglycols in general. Higher molecular weight polyethylene glycols are available under the trademark designation Carbowax, e.g. Carbowax 200—200 M.W.

(5) Saturated heterocyclic diethers having only carbon, hydrogen and oxygen atoms and 3–4 carbon atoms in the ring. Illustrative are dioxane and dioxolane.

(6) Alkyl and cycloalkyl ketones having a total of 3–7 carbon atoms. Illustrative are acetone; methyl ethyl ketone; ethyl isopropyl ketone; mesityl oxide (4-methyl-3-pentene-2-one); isopropyl butyl ketone; butanedione; pentanedione-2,4; hexanedione; cyclobutanone, cyclohexanone, methylcyclohexanone and dimethylcyclobutanedione.

(7) Lower alkyl esters of lower alkanols, lower glycols and ether glycols. Lower alkyl has 1–6 carbon atoms. Illustrative are methyl acetate, ethyl acetate, methyl propionate, ethyl butyrate, ethylene glycol monoacetate, ethylene glycol diacetate, hexanediol dipropionate, butanediol dihexanoate, and Carbowax 200 diacetate.

(8) Saturated monohydric ether alcohols having a total of 4–8 carbon atoms. Illustrative are tetrahydro-furfuryl alcohol and Pentoxol (4-methoxy-4-methyl pentanol-2).

(9) Ketoalkanols and lower alkyl esters of ketoalkanols. These have 4–8 carbon atoms in the ketoalkanol portion. Illustrative are diacetone alcohol; 4-hydroxy-2-butanone; ethyl acetoacetate and methyl levulinate.

(10) Lower alkyl esters of phosphoric acid. Illustrative are dimethyl phosphate, triethyl phosphate and tributyl phosphate.

(11) N-R-2-pyrrolidone where R is alkyl having 1–4 carbon atoms. Illustrative is N-methyl-2-pyrrolidone.

(12) R'-ethers of lower glycols and ether glycols where R' is lower alkyl or phenyl.

(13) Mono-R'-ether, mono-lower alkyl ester of lower glycols and ether glycols where R' is lower alkyl or phenyl.

Illustrative of 12 and 13 are the surfactant Tergitol NPX (nonyl phenyl polyethylene glycol ether), and the compounds sold under the trademark designation Cellosolve and Carbitol. Typical of these are: butyl Cellosolve (ethylene glycol monobutyl ether); butyl Cellosolve acetate (ethylene glycol monobutyl ether acetate); Cellosolve acetate (ethylene glycol monoethyl ether acetate); Cellosolve (ethylene glycol monoethyl ether); dibutyl Cellosolve (ethylene glycol dibutyl ether); n-hexyl Cellosolve (ethylene glycol monohexyl ether); methyl Cellosolve (ethylene glycol monomethyl ether); methyl Cellosolve acetate (ethylene glycol monomethyl ether acetate); phenyl Cellosolve (ethylene glycol monophenyl ether); butyl Carbitol (diethylene glycol monobutyl ether); butyl Carbitol acetate (diethylene glycol monobutyl ether acetate); Carbitol acetate (diethylene glycol monoethyl ether acetate); Carbitol (diethylene glycol monoethyl ether); dibutyl Carbitol (diethylene glycol dibutyl ether); diethyl Carbitol (diethylene glycol diethyl ether); n-hexyl Carbitol (diethylene glycol monohexyl ether); methyl Carbitol (diethylene glycol monomethyl ether).

(14) Di-R"-alkali metal sulfosuccinate where R" is alkyl and has 6–16 carbon atoms. These compounds are surfactants and are illustrated by Monowet MT70 (di-tridecyl sodium sulfosuccinate).

Test H

For comparison purposes pure 3,5-dimethyl-3,5-dihydroxy-1,2-peroxycyclopentane (peroxide I), a water solution of peroxide I, and numerous solutions of different solvents were tested for effectiveness as polyester resin curing catalyst. The test procedures were the same as those set out supra under "Catalytic Test Procedures" and the resin was the same as described under Table I, supra. The tests were carried out with 0.2% cobalt naphthenate (6%) added to the resin.

Each of the peroxide I solutions was adjusted to have an active oxygen content of 4% and 1% of solution by weight was used as catalyst.

TABLE 10

| | Formulation | | |
|---|---|---|---|
| | A | B | C |
| Time in Minutes: | | | |
| 30° C. Gel | 7.7 | 7.0 | 9.4 |
| R.T. Gel | 13.7 | 12.0 | 16.3 |
| R.T. Cure | 17.2 | 15.8 | 20.6 |
| Peak Exotherm, °F | 317 | 312 | 302 |
| Barcol Hardness | 40–50 | 40–50 | 40–50 |

TABLE—9

| Test | Solvent | Time in Minutes | | | Peak Exotherm, °F. | Barcol Hardess |
|---|---|---|---|---|---|---|
| | | 30° C. Gel | Room Temp. Gel | Room Temp. Cure | | |
| 1 | None | 64.8 | | | | 0 |
| 2 | Water | 17.2 | 28.4 | 42.2 | 252 | 15–25 |
| 3 | Isopropanol | 9.3 | 16.4 | 21.4 | 304 | 40–50 |
| 4 | Benzyl alcohol | 8.5 | 16.5 | 20.6 | 308 | 40–50 |
| 5 | Propylene glycol | 8.0 | 15.5 | 19.0 | 314 | 40–50 |
| 6 | 2-butene-1,4-diol | 7.5 | 13.5 | 17.0 | 308 | 40–50 |
| 7 | Dipropylene glycol | 11.4 | 19.8 | 25.2 | 300 | 40–50 |
| 8 | Carbowax 200 | 8.4 | 16.2 | 20.5 | 301 | 40–50 |
| 9 | Dioxane | 9.8 | 17.6 | 22.1 | 298 | 40–50 |
| 10 | Methyl ethyl ketone | 7.4 | 14.7 | 18.6 | 300 | 40–50 |
| 11 | Mesityl oxide | 6.5 | 12.8 | 16.5 | 313 | 30–50 |
| 12 | Acetyl acetone | 5.0 | 11.0 | 14.5 | 316 | 40–50 |
| 13 | Ethylene glycol diacetate | 9.6 | 17.1 | 22.0 | 302 | 40–50 |
| 14 | Tetrahydrofurfuryl alcohol | 7.3 | 13.9 | 18.1 | 312 | 40–50 |
| 15 | Pentoxol | 8.6 | 16.4 | 21.0 | 303 | 30–50 |
| 16 | Diacetone alcohol | 7.1 | 14.7 | 19.1 | 310 | 40–50 |
| 17 | 4-hydroxy-2-butanone | 7.1 | 13.5 | 18.2 | 308 | 40–50 |
| 18 | Ethyl acetoacetate | 6.4 | 12.1 | 17.0 | 296 | 40–50 |
| 19 | Methyl levulinate | 7.2 | 13.5 | 17.4 | 294 | 40–50 |
| 20 | Triethyl phosphate | 9.5 | 16.2 | 21.5 | 290 | 40–50 |
| 21 | N-methyl-2-pyrrolidone | 8.6 | 14.7 | 19.6 | 300 | 40–50 |
| 22 | Cellosolve | 9.4 | 15.8 | 20.5 | 299 | 40–50 |
| 23 | Methyl Cellosolve acetate | 8.9 | 15.8 | 20.6 | 302 | 40–50 |
| 24 | Diethyl Carbitol | 7.6 | 13.8 | 18.2 | 317 | 40–50 |
| 25 | Dibutyl Carbitol | 9.3 | 16.9 | 21.9 | 301 | 40–50 |
| 26 | Carbitol acetate | 8.4 | 15.7 | 19.9 | 303 | 40–50 |
| 27 | Tergitol NPX | 7.8 | 14.7 | 19.1 | 303 | 40–50 |
| 28 | Monowet MT70 | 7.4 | 13.7 | 17.7 | 308 | 40–50 |

The results of these tests are set out in Table 9. The pure Peroxide I is very slightly soluble in the resin and the long gel time (Test 1) at 30° C. (86° F.) is believed to be caused in part by the difficulty in getting an intimate dispersion of the solid peroxide into the resin. The water solution of Test 2 shows improvement over Test 1 but is still poor in terms of times and very poor in the important Barcol Hardness. All of the solvents of the invention gave outstanding room temperature results, especially in the Barcol Hardness; the variations between solvents is not commercially significant.

All of the solvents in Table 9 have at least substantial solubility in water. Inspection of the table establishes that regardless of the chemical class of solvent, all afford equivalent results when used according to these conditions. The requirements of being a liquid and substantial solubility in water distinguish each class as demonstrated by the species given in Tables 9 and 10.

Test J

Three formulations consisting of equal parts by weight of peroxide I, water and solvent were tested for curing of the cobalt containing polyester resin previously described.

Formulation A contained propylene glycol solvent; Formulation B contained Carbowax 200 solvent; and Formulation C contained hexylene glycol solvent. Each formulation contains about 4% of active oxygen.

The results of these tests are set out in Table 10.

The presence of the large amount of water surprisingly did not adversely effect the curing ability of the peroxide. The results are indeed somewhat better than those shown in Table 9 for these solvents. The ability of the solvent to bring the water into solution in the resin is an important attribute to the commercial user.

Thus having described the invention, what is claimed is:

1. A peroxide solution formulation consisting essentially of:
   (a) 3,5-dimethyl - 3,5-dihydroxy - 1,2-peroxycyclopentane; and
   (b) organic liquid solvent having substantial solubility in water, which solvent is selected from the class consisting of:
      (1) lower alkanols;
      (2) benzyl alcohol;
      (3) lower glycols;
      (4) ether glycols;
      (5) saturated heterocyclic diethers having only carbon, hydrogen and oxygen atoms and 3–4 carbon atoms in the ring;
      (6) alkyl and cycloalkyl ketones having a total of 3–7 carbon atoms;
      (7) lower alkyl esters of lower alkanols, lower glycols, and ether glycols;
      (8) saturated monohydric ether alcohols having a total of 4–8 carbon atoms;
      (9) ketoalkanols and lower alkyl esters of ketoalkanols having 4–8 carbon atoms in the ketoalkanol portion;

(10) lower alkyl esters of phosphoric acid;
(11) N-alkyl-2-pyrrolidone where alkyl has 1–4 carbon atoms;
(12) R'-ethers of lower glycols and ether glycols where R' is lower alkyl or phenyl;
(13) mono-R' ether, mono-lower alkyl ester of lower glycols and ether glycols where R' is lower alkyl or phenyl; and
(14) di-R"-alkali metal sulfosuccinate where R" is alkyl having 6–16 carbon atoms.

2. The solution of claim 1 where the solution has an active oxygen content of about 1–6%.

3. The solution of claim 1 wherein said organic liquid is N-alkyl-2-pyrrolidone where said alkyl has 1–4 carbon atoms.

4. The solution of claim 1 wherein said organic liquid is triethyl phosphate.

5. The solution of claim 1 wherein said organic liquid is propylene glycol.

6. The solution of claim 1 wherein said organic liquid is hexylene glycol.

7. The solution of claim 1 where water is present.

8. The solution of claim 7 wherein the proportions are: (a) about 10–50%; (b) about 15–90% and (c) water, not more than about 35%.

9. The solution of claim 8 where the water content is not more than about 15%.

10. The solution of claim 8 where said peroxy-cyclopentane content is about 20–40%.

11. A peroxide formulation consisting of about equal parts of:
(a) 3,5 - dimethyl - 3,5 - dihydroxy - 1,2 - peroxycyclopentane;
(b) Carbowax 200; and
(c) water.

12. A peroxide formulation consisting of:
(a) 3,5 - dimethyl - 3,5 - dihydroxy - 1,2 - peroxycyclopentane, about 30%;
(b) water, about 12%;
(c) N-methyl-2-pyrrolidone, about 29%; and
(d) triethyl phosphate, about 29%.

13. A peroxide formulation consisting of:
(a) 3,5 - dimethyl - 3,5 - dihydroxy - 1,2 - peroxycyclopentane, about 30%;
(b) water, about 30%;
(c) N-methyl-2-pyrrolidone, about 3%; and
(d) propylene glycol, about 37%.

No references cited.

LEON D. ROSDOL, *Primary Examiner.*

S. D. SCHWARTZ, *Assistant Examiner.*